United States Patent Office 3,563,955
Patented Feb. 16, 1971

3,563,955
PROCESS FOR CROSS-LINKING POLYACETAL CO-POLYMERS WITH HYDROZINE OR DICARBOX-YLIC ACID HYDRAZIDES AND PRODUCT PRO-DUCED THEREBY
Karl-Heinz Hafner, Bad Orb, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of applications Ser. No. 558,245, June 17, 1966, now Patent No. 3,454,528, dated July 8, 1969, and Ser. No. 581,760, Sept. 26, 1966. This application Jan. 7, 1969, Ser. No. 789,604
Int. Cl. C08g 9/04, 9/06
U.S. Cl. 260—72.5
7 Claims

ABSTRACT OF THE DISCLOSURE

A process for cross-linking polyoxyalkylene copolymers having pendant free aldehyde groups spaced along the polymer chain thereof with hydrazine or a dicarboxylic acid hydrazide of the formula

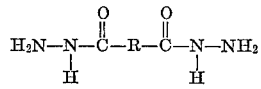

wherein R stands for an alkylene radical of 1 to 20 carbon atoms, a phenylene or naphthylene radical which is substituted by $(A)_x$ and/or $(B)_y$, A being an alkyl group of 1 to 6 carbon atoms, $x$ being 0 to 4, $y$ being 0 to 4 and $x+y$ being smaller than 5, or in which R stands for a phenylene and/or naphthylene radical which is or are interrupted by a saturated and/or unsaturated hydrocarbon radical with 1 to 10 carbon atoms, or in which R is a cycloaliphatic radical of 4 to 7 carbon atoms which is substituted by $(D)_a$ and/or $(E)_b$ and/or $(F)_c$, D being an alkyl group of 1 to 6 carbon atoms, E being an alkoxy group of 1 to 6 carbon atoms and F being a phenyl radical, and $a$ being 0 to 5, $b$ being 0 to 5 and $c$ being 0 to 2, or in which R is a polyacrylic acid radical. Representative dicarboxylic acid dihydrazides are adipic acid bishydrazide, sebacic acid bishydrazide, polyacrylic acid hydrazide and terephthalic acid bishydrazide. The cross-linking agent may be used to the extent of 0.01 to 50% by weight, based on the weight of the uncross-linked polymer. By using such cross-linking agents, good control of molecular weight and consequently of the flow properties of the cross-linked copolymer are obtained. The cross-linked polymers are also claimed.

This application is a continuation-in-part of our prior pending applications Ser. No. 558,248 filed June 17, 1966 and Ser. No. 581,760 filed Sept. 26, 1966.

The present invention relates to copolymers of trioxane, processes for making and cross-linking the copolymers and to the cross-linked copolymers thus obtained.

It is known that trioxane can be reacted in the presence of cationic catalysts with cyclic ethers having at least two neighboring carbon atoms in the ring to obtain copolymers which are stable against alkaline degradation and make valuable plastics because of their good mechanical and physical properties. Such copolymers have the disadvantage, however, that they cannot subsequently be modified in the polymer chain by chemical reactions, except for chemical stabilizing reactions at the end of the polymer chain. It has also been proposed to copolymerize trioxane with bifunctional compounds such as cyclohexene-1,2-oxide - 4,4-dioxymethylene-formal and beta, gamma - epoxypropoxy-beta-prime,gamma-prime-carbonato-propoxyalkanes, whereby polymers are obtained which are cross-linked during the polyemization reaction or during subsequent heat treatment.

Now we have found that copolymers prepared from a monomer mixture containing 70 to 99.99% by weight of trioxane, 0.01 to 20% by weight of bifunctional compounds and 0 to 10% by weight of cyclic ethers can be obtained in advantageous manner in the presence of cationic catalysts at temperatures within the range of from —50° to +110° C., by using bifunctional compounds of the formula

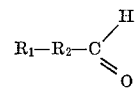

in which $R_1$ represents a 2,3-epoxy-propyloxy radical or a 1,3-dioxolano-4-methyloxy radical and $R_2$ stands for an aromatic hydrocarbon radical with 6 or 10 carbon atoms which is substituted by $(A)_x$ and/or $(B)_y$, A being an alkyl radical of 1 to 6 carbon atoms, B being an alkoxy radical of 1 to 6 carbon atoms, $x$ being 0 to 4, $y$ being 0 to 4 and $x+y$ being smaller than 5.

Examples of suitable bifunctional compounds are p-glycidoxy - benzaldehyde, o - glycidoxybenzaldehyde, m-glycidoxybenzaldehyde, 3 - methoxy-4-glycidoxybenzaldehyde, 3-methyl-6-glycidoxybenzaldehyde and 4-glycidoxy-1-naphthaldehyde.

In addition to trioxane and bifunctional compounds, cyclic ethers may be used in an amount within the range of 0 to 10% based on the total weight of monomers in the reaction mixture. The cyclic ether used may be, for example, a compound of the following formula

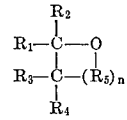

in which each of $R_1$, $R_2$, $R_3$ and $R_4$ represents a hydrogen atom or an alkyl group which contains 1 to 5 carbon atoms and which may be substituted by one or more halogen atoms; and in which $R_5$ stands for a methylene, alkylmethylene, haloalkylmethylene, oxymethylene, alkyloxymethylene or haloalkyloxymethylene radical in which the alkyl group has 1 to 5 carbon atoms and $n$ is 0 to 3, or in which $R_5$ represents the group

and $n$ is 1 and $m$ is 1 to 3. The abovementioned alkyl groups may be substituted by up to 3 halogen atoms, advantageously chlorine atoms. It is particularly advantageous to use ethylene oxide, glycolformal or diglycolformal as the cyclic ether. It is also possible to use, for example, propylene oxide, epichlorhydrin, 4-chloromethyl dioxolane, 1,4-butanediolformal, 1,4-butenediolformal, 1,4-butanedioldiglycidyl ether, oxacyclobutane and 1,3-dioxolane.

The process of the invention yields copolymers in which the comonomer containing the free aldehyde group is incorporated in the macromolecular chain. For example, copolymers of trioxane, ethylene oxide and p-glycidoxybenzaldehyde which have been subjected to an alkaline treatment in benzyl alcohol at 150° C. and then boiled several times with methanol, show the carbonyl band characteristic of benzaldehyde in the infrared spectrum. Copolymers of trioxane and ethylene oxide which have been subjected to an alkaline treatment with benzyl alcohol at 150° C. and boiled several times with methanol show no carbonyl band. In a copolymer of 100 parts by weight of trioxane, 2 parts by weight of ethylene oxide and 5 parts by weight of p-glycidoxybenzaldehyde, for example, which had been treated at 150° C. with benzyl alcohol and boiled several times with methanol, 2.6% by weight of incorporated p-glycidoxybenzaldehyde could be traced by quantitative evaluation of the infrared spectrum. After these copolymers containing aldehyde groups have been treated with oxidizing agents in the presence of sodium hydroxide solution, the carbonyl band of benzaldehyde in the infrared spectrum disappears and the corresponding carboxylate band appears. Another proof of the presence of free aldehyde groups in the copolymer is the pronounced hydrophilic properties after condensation with malonic acid.

The copolymers obtained by the process of the invention can be chemically modified by subsequent treatment with agents reacting with free aldehyde groups. The free aldehyde groups in the polymer chain can be converted, for example, with appropriate oxidizing agents into carboxyl groups and in the presence of a base into carboxylate groups. Furthermore, the aldehyde groups are susceptible to reactions of the type of a Knoevenagel-Dobner-condensation (cf. Wagner-Zook, Synthetic Organic Chemistry, 3rd edition, 1961, edited by John Wiley and Sons, Inc., New York, London, page 52). They may also be cross-linked by hydrazine and dicarboxylic dihydrazides in a manner described in further detail below.

The cationic polymerization may be carried out according to known methods in the melt, in solution or in suspension. As solvents or dispersing agents there may be used aliphatic or cycloaliphatic hydrocarbons with 5 to 18 carbon atoms that are inert toward the monomers and the catalyst, for example, n-hexane or cyclo-hexane. The polymerization is preferably carried out in the melt at temperatures within the range of from +60° to +110° C.

For starting the copolymerization in accordance with the invention, it is particularly suitable to use Lewis acids (for a definition of Lewis acids see Kortum, Lehrbuch der Elktrochemie, Wiesbaden 1948, pages 300 and 301), preferably boron fluoride. The latter is advantageously used in the form of its complex compounds, for example, in the form of an etherate, oxonium fluoroborate or a substituted aryldiazonium fluoroborate. The concentration of the catalyst depends primarily on the efficacy of the catalyst as a polymerization initiator and may be within the range of from 0.0001 to 1.0% calculated on the total weight of the monomer mixture.

To remove unstable terminal semi-acetal groups, the copolymers obtained by the process of the invention may be subjected to an alkaline degradation known in itself (cf. Belgian Pat. No. 617,897). It is advantageous to add to the copolymers also a known light or oxidation stabilizer.

The copolymers obtained by the process described above are heat resistant and can be worked in the thermoplastic range. They may be used for the manufacture of thermoplastic adhesives, as coating compounds for metals and for the preparation of dispersions. Also it has been found that the molecular weight and consequently the flow properties of the copolymers may be advantageously modified by cross-linking them with hydrazine or a dicarboxylic acid dihydrazide.

The dicarboxylic acid bishydrazide used to cross-link the copolymers may be a compound of the following formula

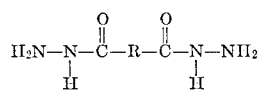

in which R is an alkylene radical of 1 to 20 carbon atoms, a phenylene or naphthylene radical which is substituted by $(A)_x$ and/or $(B)_y$, A being an alkyl group of 1 to 6 carbon atoms and B being an alkoxy group of 1 to 6 carbon atoms, $x$ being 0 to 4, $y$ being 0 to 4, and $x+y$ being smaller than 5, or in which R is a phenylene and/or naphthylene radical which is or are interrupted by a saturated and/or unsaturated hydrocarbon radical of 1 to 10 carbon atoms, or in which R is a cycloaliphatic radical of 4 to 7 carbon atoms which is substituted by $(D)_a$ and/or $(E)_b$ and/or $(F)_c$, D being an alkyl group of 1 to 6 carbons, E being an alkoxy group of 1 to 6 carbon atoms and F being a phenyl radical, and $a$ being 0 to 5, $b$ being 0 to 5, and $c$ being 0 to 2, or in which R is a polyacrylic acid radical.

Examples of suitable compounds are hydrazine, hydrazine hydrate, adipic acid bishydrazide, sebacic acid bishydrazide, polyacrylic acid hydrazide, phthalic acid bishydrazide, isophthalic acid bishydrazide, terephthalic acid bishydrazide, naphthalene dicarboxylic acid bishydrazide, hexahydroterephthalic acid bishydrazide, truxillic acid bishydrazide and maleic acid bishydrazide. The cross-linking agents are used in an amount within the range of 0.01 to 50% by weight calculated on the weight of uncross-linked polymer.

The cross-linking reaction may be carried out in solution, in suspension or advantageously in the melt. As solvents, inert polar solvents, for example benzyl alcohol, chlorobenzene, dimethyl-formamide and butyrolactone may be used. Suitable dispersing agents are inert aliphatic, aromatic or cycloaliphatic hydrocarbons of 6 to 18 carbon atoms, for example, n-hexane, cyclohexane or toluene.

Cross-linking may be carried out at temperatures within the range of 50° to 230° C. In solutions, the temperature is advantageously within the range of 110° to 170° C., in suspensions within the range of 50° and 170° C., and in the melt within the range of 150° to 230° C.

As indicated above, cross-linking of the copolymers in accordance with the invention enables the molecular weight and consequently the flow properties of copolymers of trioxane to be influenced after the polymerization. The cross-linked copolymers are distinguished by a good thermostability. They are suitable for the manufacture of hollow bodies by the extrusion process, which hollow bodies are distinguished by a uniform wall thickness because the material does not show the usual necking when it issues from the extruder nozzle.

The following examples serve to illustrate the invention but are not intended to limit it.

Example 1

20 cc. of boron fluoride dibutyl etherate which had been diluted with cyclohexane to obtain a ratio of 1:40, were added as a catalyst to a batch consisting of 1000 g. of trioxane, 20 g. of ethylene oxide and 50 g. of p-glycidoxybenzaldehyde. The batch was then polymerized in a closed vessel on a thermoconstant bath of 70° C. The polymerization time was 30 minutes. The block of polymer so obtained was ground and treated for 30 minutes at 150° C. with benzyl alcohol containing 1% by weight of triethanolamine to remove unstable terminal semi-acetal groups and residual monomers. After cooling, the polymer was suction-filtered, boiled several times with methanol and dried in vacuo at 50° to 70° C. The polymer was obtained in a yield of 685 g.

The polymer had a reduced specific viscosity $\eta_{red.}$ of 0.33. To measure the reduced specific viscosity, 50 mg. of polymer were dissolved at 140° C. in 10 cc. of butyrolactone containing 0.2% dicyanodiamide and the viscosity was determined at said temperature. The heat stability $K_D$ was 0.0209% per minute. To determine the heat stability, a sample of the polymer was stabilized wtih 0.7% by weight of 2,2-methylene-bis-4-methyl-6-tertiary-butylphenol and 0.2% by weight of dicyanodiamide and then subjected for 45 minutes to thermal degradation at 230° C.

Example 2

In a manner analogous to Example 1, 1000 g. of trioxane, 20 g. of ethylene oxide and 10 g. of p-glycidoxybenzaldehyde were polymerized in the presence of 15 cc. of boron fluoride dibutyl etherate (1:40). The yield after alkaline degradation was 632 g.

The following values were found: reduced specific viscosity $\eta_{red.}=0.41$; heat stability $K_D=0.0281$.

Example 3

In a manner analogous to Example 1, 100 g. of trioxane, 2 g. of ethylene oxide and 3 g. of o-glycidoxybenzaldehyde were polymerized in the presence of 4 cc. of boron fluoride dibutyl etherate (1:40). The yield after alkaline degradation was 62 g.

Reduced specific viscosity $\eta_{red.}=0.32$.

Example 4

In a manner analogous to Example 1, 100 g. of trioxane, 2 g. of ethylene oxide and 3 g. of m-glycidoxybenzaldehyde were polymerized in the presence of 1 cc. of boron fluoride di-n-butyl etherate (1:40). The yield after alkaline degradation was 70 g.

Reduced specific viscosity $\eta_{red.}=0.50$;
Heat stability $K_D=0.0196$.

Example 5

In a manner analogous to Example 1, 100 g. of trioxane, 2 g. of ethylene oxide and 5 g. of 3-methoxy-4-glycidoxybenzaldehyde were polymerized in the presence of 2 cc. of boron fluoride di-n-butyl etherate (1:40). The yield after alkaline degradation was 48 g.

Reduced specific viscosity $\eta_{red.}=0.26$;
Heat stability $K_D=0.0492$.

Example 6

In a manner analogous to Example 1, 100 g. of trioxane, 2 g. of ethylene oxide and 2 g. of 3-methyl-6-glycidoxybenzaldehyde were polymerized in the presence of 1 cc. of boron fluoride di-n-butyl etherate (1:40). The yield after alkaline degradation was 45 g.

Reduced specific viscosity $\eta_{red.}=0.54$;
Heat stability $K_D=0.0319$.

Example 7

Several batches each consisting of 10 g. of a copolymer prepared as described in Example 1 were dissolved in 350 cc. of benzyl alcohol and treated for 30 minutes at 120° C. with increasing amounts of an 80% solution of hydrazine hydrate. The following table indicates the melt indices $i_2$ obtained with increasing amounts of hydrazine hydrates, as determined according to ASTM–D 1238–52 T:

| Cc. of an 80% solution of hydrazine hydrate | Melt index $i_2$ (190° C.) g./10 minutes |
|---|---|
| 0 | 156 |
| 0.05 | 41 |
| 0.10 | 34 |
| 0.20 | 4.1 |
| 0.30 | 1.0 |
| 0.40 | (¹) |

¹ Not measurable (cross-linked).

Example 8

Several batches each comprising 5 g. of a copolymer prepared as described in Example 1 were mixed with increasing amounts of adipic acid bishydrazide and additionally stabilized with 35 mg. of 2,2-methylene-bis-4-methyl-6-tertiarybuylphenol. After melting at 190° C. for 10 minutes, the following melt indices $i_2$ were determined according to ASTM–D 1238–52 T:

| Mg. of adipic acid bishydrazide | Melt index $i_2$ (190° C.) g./10 minutes |
|---|---|
| 0 | 156 |
| 10 | 126 |
| 15 | 49 |
| 20 | 37 |
| 30 | 5.7 |
| 40 | (¹) |

¹ Not measurable (cross-linked).

Example 9

Several batches each comprising 5 g. of a copolymer prepared as described in Example 1 were mixed with increasing amounts of sebacic acid bishydrazide and additionally stabilized with 35 mg. of 2,2-methylene-bis-4-methyl-6-tertiarybutylphenol. After melting at 190° C. for 10 minutes, the following melt indices $i_2$ were determined according to ASTM–D 1238–52 T:

| Mg. of sebacic acid bishydrazide | Melt index $i_2$ (190° C.) g./10 minutes |
|---|---|
| 0 | 156 |
| 10 | 139 |
| 20 | 68 |
| 45 | 21 |
| 65 | 9.5 |
| 70 | 0.8 |
| 75 | (¹) |

¹ Not measurable (cross-linked).

Example 10

Several batches each comprising 5 g. of a copolymer prepared as described in Example 1 were mixed with increasing amounts of polyacrylic acid hydrazide and additionally stabilized with 35 mg. of 2,2-methylene-bis-4-methyl-6-tertiary-butylphenol. After melting at 190° C. for 10 minutes, the following melt indices $i_2$ were determined according to ASTM–D 1238–52 T:

| Mg. of polyacrylic acid hydrazide | Melt index $i_2$ (190° C.) g./10 minutes |
|---|---|
| 0 | 156 |
| 50 | 138 |
| 200 | 8.6 |
| 500 | (¹) |

¹ Not measurable (cross-linked).

Example 11

A copolymer was prepared as in Example 1 except that the monomer mixture used comprised 100 g. of trioxane, 2 g. of ethylene oxide and 2 g. of para-glycidoxybenzaldehyde. 30 g. of this copolymer were treated for 10 minutes at 130° C. in 500 cc. of benzyl alcohol with 3 g. of terephthalic acid bishydrazide. The reduced specific viscosity $\eta_{red.}$ of the starting material was 0.34 and that of the product treated with terephthalic acid bishydrazide was 1.16. (For determining the reduced specific viscosity $\eta_{red.}$, 50 mg. of polymer were dissolved at 140° C. in 10 cc. of butyrolactone containing 0.2% of dicyandiamide and the viscosity was measured at the said temperature of 140° C.)

What is claimed is:

1. A process for cross-linking polyacetal copolymers made from 70 to 99.99% by weight of trioxane, 0 to 10% by weight of a cyclic ether of the formula

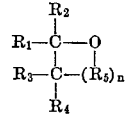

in which each of $R_1$, $R_2$, $R_3$ and $R_4$ represents a hydrogen atom or an alkyl group of 1 to 5 carbon atoms which may be substituted by one or more halogen atoms; and in which $R_5$ stands for a methylene, alkylmethylene, haloalkylmethylene, oxymethylene, alkyloxymethylene or haloalkyloxymethylene, and $n$ is 0 to 3, or in which $R_5$ represents the group —(O—CH$_2$—CH$_2$)$_m$—OCH$_2$— and $n$ is 1 and $m$ is 1 to 3, and 0.01 to 20% by weight of a bifunctional compound of the formula

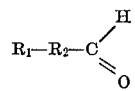

in which $R_1$ represents a 2,3-epoxy-propyloxy radical or a 1,3-dioxolano-4-methyloxy radical and $R_2$ stands for an aromatic hydrocarbon radical with 6 or 10 carbon atoms which is substituted by $(A)_x$ and/or $(B)_y$, A being an alkyl radical of 1 to 6 carbon atoms, B being an alkoxy radical of 1 to 6 carbon atoms, $x$ being 0 to 4, $y$ being 0 to 4 and $x+y$ being smaller than 5, said process comprising reacting the copolymer at a temperature of 50° to 230° C. with 0.2 to 50% by weight, based on the weight of the copolymer, of a cross-linking agent which is hydrazine or a dicarboxylic acid dihydrazide of the formula

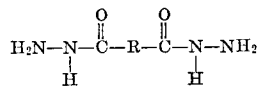

wherein R stands for an alkylene radical of 1 to 20 carbon atoms, a phenylene or naphthylene radical which is substituted by $(A)_x$ and/or $(B)_y$, A being an alkyl group of 1 to 6 carbon atoms and B being an alkoxy group of 1 to 6 carbon atoms, $x$ being 0 to 4, $y$ being 0 to 4, and $x+y$ being smaller than 5, or in which R stands for a phenylene and/or napthylene radical which is or are interrupted by a saturated and/or unsaturated hydrocarbon radical of 1 to 10 carbon atoms, or in which R is a cycloaliphatic radical of 4 to 7 carbon atoms which is substituted by $(D)_a$ and/or $(E)_b$ and/or $(F)_c$, D being an alkyl group of 1 to 6 carbon atoms, E being an alkoxy group of 1 to 6 carbon atoms and F being a phenyl radical, and $a$ being 0 to 5, $b$ being 0 to 5 and $c$ being 0 to 2, or in which R is a polyacrylic acid radical.

2. A process according to claim 1 wherein the cross-linking agent is hydrazine.
3. A process according to claim 1 wherein the cross-linking agent is adipic acid bis-hydrazide.
4. A process according to claim 1 wherein the cross-linking agent is sebacic acid bis-hydrazide.
5. A process according to claim 1 wherein the cross-linking agent is polyacrylic acid hydrazide.
6. A process according to claim 1 wherein the cross-linking agent is terephthalic acid bis-hydrazide.
7. A polyacetal copolymer cross-linked with hydrazine or a dicarboxylic acid dihydrazide according to the process of claim 1.

References Cited
UNITED STATES PATENTS

| 3,454,528 | 7/1969 | Häfner et al. | |
| 2,597,467 | 5/1952 | Fisher et al. | 260—39 |
| 2,509,183 | 5/1950 | Auten | 260—72 |
| 2,485,239 | 10/1949 | Izard | 260—67 |

HAROLD D. ANDERSON, Primary Examiner

R. J. KOCH, Assistant Examiner

U.C. Cl. X.R.

260—33.4, 33.6, 33.8, 72, 30.4, 45.9, 45.95

UNITED STATES PATENT OFFICE
CERTIFICATE OF CORRECTION

Patent No. 3,563,955   Dated February 16, 1971

Inventor(s) Karl-Heinz Hafner, Bad Orb, and Edgar Fischer

It is certified that error appears in the above-identified patent and that said Letters Patent are hereby corrected as shown below:

In the Heading, after "Ser. No. 789,604" and before the International Classification number, insert:

--Claim priority, German Application F 46,475, June 30, 1965 and F 47,341, September 26, 1966.--

Signed and sealed this 22nd day of June 1971.

(SEAL)
Attest:

EDWARD M. FLETCHER, JR.
Attesting Officer

WILLIAM E. SCHUYLER, JI
Commissioner of Patent